United States Patent [19]

Matsuda

[11] 4,078,176

[45] Mar. 7, 1978

[54] MASS SPECTROMETER

[75] Inventor: Hisashi Matsuda, Takarazuka, Japan

[73] Assignee: Hitachi, Ltd., Japan

[21] Appl. No.: 670,834

[22] Filed: Mar. 26, 1976

[30] Foreign Application Priority Data

Sep. 26, 1975 Japan ............................... 50-115579

[51] Int. Cl.[2] ........................ B01D 59/44; H01J 39/34

[52] U.S. Cl. ..................................... 250/296; 250/299

[58] Field of Search ............... 250/281, 282, 283, 292, 250/293, 294, 295, 296, 299, 396, 397

[56] References Cited

U.S. PATENT DOCUMENTS

| | | | |
|---|---|---|---|
| 3,233,099 | 2/1966 | Berry et al. | 250/296 |
| 3,473,019 | 10/1969 | Brubaker | 250/292 |
| 3,585,384 | 6/1971 | Castaing et al. | 250/296 |
| 3,622,781 | 11/1971 | Liebl | 250/296 |
| 3,769,513 | 10/1973 | Delamy | 250/294 |

*Primary Examiner*—Bruce C. Anderson
*Attorney, Agent, or Firm*—Craig & Antonelli

[57] ABSTRACT

The molecules of a sample are ionized and the produced ions are subjected to a dispersion according to their kinetic energies in an electrostatic field and then to a dispersion according to their mass numbers in a magnetic field. Of the mass-dispersed ions, some having a specific mass number are focussed by means of a lens system disposed between the electrostatic and magnetic fields and the focussed ions are detected by an ion detector.

11 Claims, 4 Drawing Figures

MASS SPECTROMETER

BACKGROUND OF THE INVENTION

1. Field of the Invention

The present invention relates to a mass spectrometer and more particularly to a double focussing mass spectrometer.

2. Description of the Prior Art

To mass-analyze ions having an energy spread with high resolution, a double focussing mass spectrometer is commonly used. With this type of spectrometer, ions having the same mass number are focussed at a single position even if they differ from one another in kinetic energy. Conversely, ions having the same energy as those ions mentioned but having different mass numbers cannot be focussed at the above said position. This focussing action is attained by the combination of an electrostatic and a magnetic field respectively having the following actions; the electrostatic field has an energy converging action in that ions are dispersed and focussed in accordance with their energies while the magnetic field possesses a directional converging action in that ions are dispersed and focussed in accordance with their mass number. In other words, ions emitted from an ion source are lead into an electrostatic field and if some of the ions have the same energy, they are focussed at a first predetermined focus position. The focussed ions are then led into a magnetic field and of all the focussed ions a group of ions having a certain mass number are focussed at a second predetermined focus position while the other ions not belonging to the group are not focussed on the second focus position. On the other hand, of the ions which the electrostatic field failed to focus at the first focus position, some having the same mass number as those focussed at the second focus position are also focussed at the second focus position by means of the magnetic field and the other having different mass numbers are diverted from the second focus position. Accordingly, if a collector slit is disposed at the second focus position, the ions passing through the slit can be received by an ion detector.

It is very preferable for manufactures as well as users to reduce the size and cost of such a double focussing mass spectrometer without adversely affecting its function.

It may be considered that the simplest way to reduce the size diminishes the angles of deflection by electric and magnetic fields, because this artifice leads to the reduction of the spaces for the electrostatic and magnetic fields. However, if the angles of deflection are decreased, the focus position becomes remoter and the linear portions of the ion trajectory also become longer, so that the decrease in the spaces for the electrostatic and magnetic fields is canceled by the increase in the length of trajectory, the size of the spectrometer remaining substantially unaltered. Moreover, the remoter is the focussing position, the longer is the distance from the ion source to the electrostatic field. In this case, therefore, the utility factor of the ions produced in the ion source is lowered, which results in the degradation of the sensitivity of the mass spectrometer.

SUMMARY OF THE INVENTION

One object of the present invention is to provide a mass spectrometer which can be easily reduced in size while meeting the condition for double focussing.

Another object of the present invention is to provide a mass spectrometer in which the adjustment for establishing the double focussing condition is easy.

Yet another object of the present invention is to provide a mass spectrometer which is small in size but can analyze ions having relatively large mass numbers.

According to the present invention, which has been made to attain the above objects, the molecules of a sample are ionized and the resultant ions are subjected to dispersion according to their kinetic energies and mass numbers in order that ions having a specific mass number may be chosen. The selected ions having the specific mass number are then focussed in the plane of dispersion by a lens field whose intensity can be electrically adjusted. The focussed ions are finally detected.

As described previously, with a conventional double-focussing mass spectrometer, the smaller are the angles of deflection by electrostatic and magnetic fields, the remoter is the focus position. However, according to the present invention, the double focussing action, i.e. energy and directional focussing, can be easily obtained while the focus position is prevented from being remoter, by the use of a variable lens field. Namely, according to the present invention, the double focussing action can be easily obtained while the size and cost of the mass spectrometer are both reduced, and moreover the utility factor of the ions produced by the ion source can also be increased.

As regards the conventional double-focussing mass spectrometer, the geometrical dimensions of the electrostatic field and the magnetic field and the relative positions among the ion source, slits, electrostatic and magnetic fields are exactly determined on the basis of the rigorous numerical calculations of ion-optics, but the complete double focussing cannot be attained in practice without adjusting mechanisms. The adjusting mechanisms have complicated structures and their manipulation including geometrical locating are also complex. On the other hand, according to the present invention, the double focussing condition can be easily achieved by electrically adjusting the electrostatic lens and therefore the precision in the dimensions of the electric and magnetic fields and in the relative positions among the ion source, slits, electrostatic field and magnetic field need not be so severe. Moreover, the electrostatic lens itself is not so complicated and expensive and the double focus positions can be controlled by simply adjusting the lens.

Other objects, features and advantages of the present invention will become apparent when one reads the following description of this specification with the aid of the attached drawings.

DESCRIPTION OF THE PREFERRED EMBODIMENTS

Figure 1:
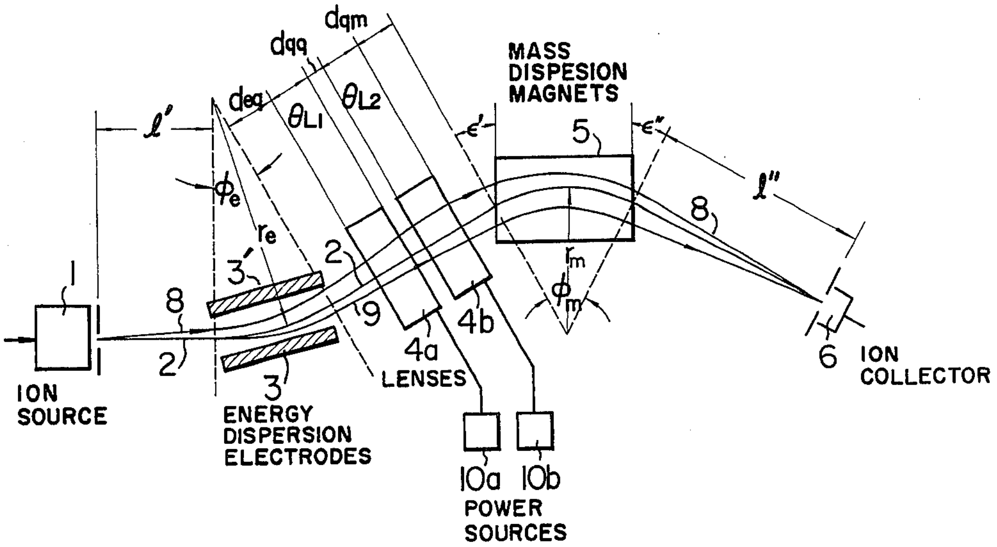
FIG. 1 schematically shows an ion-optical system in a mass spectrometer as an embodiment of the present invention.
Figure 2:
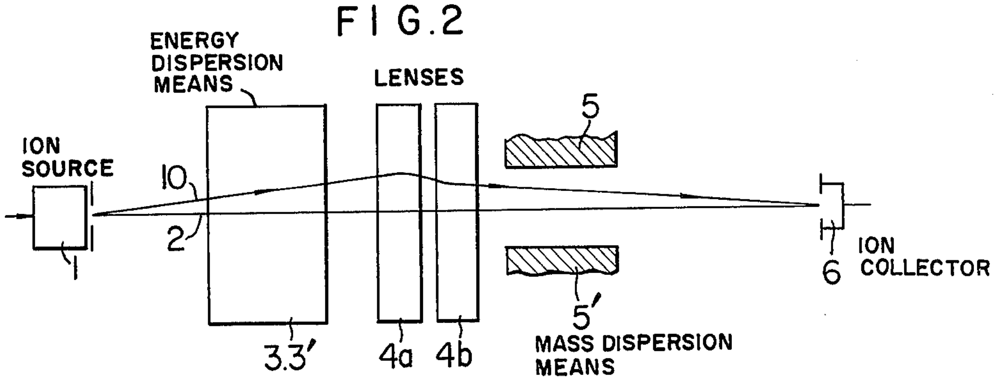
FIG. 2 is a bottom view of the ion-optical system shown in FIG. 1.
Figure 3A:
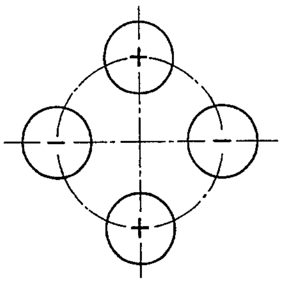
FIGS. 3*a* and 3*b* are front views of the electrostatic lenses 4*a* and 4*b* shown in FIGS. 1 and 2.
Figure 3B:
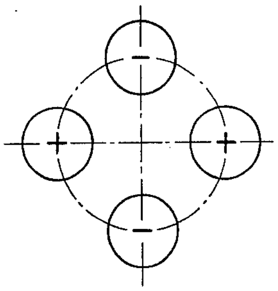

FIGS. 1, 2 and 3 show an embodiment of the present invention. A sample to be analyzed is introduced as indicated by an arrow in an ion source 1, in which the molecules of the sample are ionized. The produced ions are led into the electrostatic field established between a pair of flat plate electrodes 3 and 3' disposed opposite to and in parallel with each other and then dispersed in the electrostatic field according to their kinetic energies. The thus dispersed ions are further conducted through electrostatic lenses 4*a* and 4*b* into a magnetic field built up by a pair of magnetic poles 5 and 5' oppositely disposed and having a rectangular cross section. The ions are dispersed in the magnetic field according to their mass numbers, in the direction opposite to that of the previous dispersion. As a result, ions having a specific mass number are detected by a collector 6. The electrostatic lenses 4*a* and 4*b* are shown in FIGS. 3*a* and 3*b*, respectively, wherein lateral axes represent the direction of the previous dispersion and longitudinal axes the direction perpendicular to that of the previous dispersion. Each of the electrostatic lenses 4*a* and 4*b* is a quadrupole lens consisting of four electrodes arranged diametrically and separated by 90° from one another on a circle, as shown in FIG. 3. The adjacent electrodes of each of lenses 4*a* and 4*b* are different in polarity from each other, and the lenses 4*a* and 4*b* are inverse in polarity to each other. Accordingly, lens fields to focus ions in a plane can be established by applying dc voltages from adjustable power sources 10*a* and 10*b* to the lenses 4*a* and 4*b*. With the arrangement shown in FIGS. 1 and 2, for example, the adjustable power sources 10*a* and 10*b* apply dc voltages to the lenses 4*a* and 4*b* so that the lens 4*b* may focus the ions in a plane perpendicular to the magnetic field, i.e. in the plane of dispersion, and that the lens 4*a* may focus the ions in a plane perpendicular to the plane of dispersion. Now, it is assumed that the ions 2 and 8 have different directions of emission from the ionization source 1 but possess the same kinetic energy and mass number and that the ions 9 have the same mass number as the ions 2 and 8 and the same direction of emission as the ions 2 but possess a kinetic energy different from that of the ions 2 and 8. These ions are dispersed according to their kinetic energies by the electrostatic field and then dispersed according to their mass numbers by the magnetic field. Without the electrostatic lenses 4*a* and 4*b* in this case, the ions 2, 8 and 9 would not be focussed at the collector 6 located at the double-focus position since the electrodes 3 and 3' and the magnetic poles 5 and 5' have only simple structure; the former are the flat plates disposed opposite to and in parallel with each other and the latter have a rectangular shape and are disposed opposite to each other, and since the angles of deflection by the fields is small. In this embodiment shown in the figures, however, the lens 4*b* is provided and by adjusting the intensity of the lens field, the ions 2, 8 and 9 can be easily focussed at the collector 6. Accordingly, the double focussing action, i.e. energy focussing and directional focussing, can be realized without increasing the size of the mass spectrometer. Moreover, since the double focussing effect can be easily obtained by adjusting the voltage applied to the lens 4*b* and hence the intensity of the lens field, the geometrical dimensions of the electrostatic and magnetic fields and the relative positions among the fields, the ion source 1 and the collectors 6 need not be precisely determined and therefore it is not necessary to fabricate a mass spectrometer with high precision.

As is known to those skilled in the art, the trajectory of a monovalent ion having a mass number M and accelerated by a voltage of U (volt) is curved in a magnetic field having a density of B (gauss), with a radius of curvature $r_m$ (cm) given by the equation $Br_m = 143.9\sqrt{MU}$. For example, in the case of $U = 1000$ volt, $r_m = 10$ cm and $M = 1000$, a strong magnetic field of about 15,000 gauss is needed. Under the same condition, a field of 5000 gauss suffices for $r_m = 30$ cm. In the case where a strong magnetic field is used, large coils and heavy cores are also needed. Accordingly, when ions having great mass numbers are to be analyzed, it is more preferable in respect of reducing the size of mass spectrometer to use a moderate magnetic field accompanied by a relatively large radius of curvature of the trajectory rather than a very strong magnetic field with a small radius of curvature in the trajectory. In other words, if the radius of curvature is relatively large, a smaller device can analyze ions having larger mass numbers in comparison with the case to the contrary.

Lens 4*b* is provided to focus ions only in the plane of dispersion by the electric and magnetic fields, but in practice it also makes ions diverge in a plane perpendicular to the plane of dispersion. If the divergence of ions is not desired, another similar lens may be used to offset the undesirable divergence. In FIGS. 1 and 2 showing an embodiment of the present invention, an electrostatic lens 4*a* is used as such a compensatory lens. The lens 4*a* serves to focus the ions in a plane perpendicular to the plane of dispersion and if the intensity of the lens field of the lens 4*a* is adjusted by changing the voltage applied to the lens 4*a*, the spread of the ions by the lens 4*b* in the plane perpendicular to the plane of dispersion can be compensated. In this case, since the lens 4*a* has an effect of making the ions diverge in the plane of dispersion, it is necessary to appropriately adjust the voltages applied to the lenses 4*a* and 4*b* so that the undesirable divergence of ions by the lens 4*b* is compensated while the condition for double focussing is satisfied.

In addition to the function of compensating the undesirable divergence of ions by the lens 4*b*, the lens 4*a* can serve to focus the ions in a plane perpendicular to the plane of dispersion. Namely, since the voltage applied to the lens 4*a* and hence the lens field thereof can be arbitrarily changed, the ions can also be focussed in the plane perpendicular to the plane of dispersion. Therefore, the two-directional or dimensional focussing of the ions can be effected by this structure described above. Since the lens 4*a* has both the effect of making the ions diverge in the plane of dispersion and the effect of converging the ions in a plane perpendicular to the plane of dispersion while the lens 4*b* has both the effect of converging the ions in the plane of dispersion and the effect of making the ions diverge in the plane perpendicular to the plane of dispersion, then the voltages applied to the lenses 4*a* and 4*b* should be adjusted in view of these effects so as to perform two-directional or dimensional focussing.

If the lenses 4*a* and 4*b* are placed between the magnetic field and the collector 6, the diameter of a mass-spectrometer tube used (not shown) restricts the width of the spread of ions in the plane perpendicular to the plane of dispersion, where the ions pass through the magnetic field. On the other hand, if the lenses 4*a* and 4*b* are placed between the ionization source 1 and the electrostatic field, the cross-over point of ions is near the ion source 1 so that the width of spread of the ion in the plane perpendicular to the plane of dispersion becomes too large. This is a problem to be solved. According to the present invention in which the lenses 4*a* and 4*b* are interposed between the electric and magnetic fields, the above mentioned drawbacks can be eliminated.

In the embodiment shown in the figures, the electrodes 3 and 3' are a pair of oppositely, parallel disposed flat plates and the magnetic poles 5 and 5' are a pair of oppositely disposed ones having a rectangular cross section, that is, both electrodes and magnetic poles have simple structures so that the fabrication thereof is very easy. Moreover, with these structures, even if a magnet is constructed of laminated silicon steels as used in a transformer adapted for high speed magnetic sweep, the magnetic poles are easy to be fabricated and incorporated into the magnet.

The widths of the converged ion images are usually given by the following equations.

The width in the lateral direction (perpendicular to the magnetic field) of the ion image (approximation up to second order) $X_2$:

$$X_2 = A_xX + A_\alpha\alpha + A_\delta\delta + A_{xx}X^2 + A_{x\alpha}X\alpha + A_{x\delta}X\delta + A_{\alpha\alpha}\alpha^2 + A_{\alpha\delta}\alpha\delta + A_{\delta\delta}\delta 2 + A_{yy}Y^2 + A_{y\beta}Y\beta + A_{\beta\beta}\beta^2$$

The width in the longitudinal direction of the ion image (approximation up to first order) $Y_2$:

$$Y_2 = A_yY + A_\beta\beta$$

Here, $X$, $\alpha$, $\delta$, $Y$ and $\beta$ are the lateral width of the ion beam emanating from the ion source, the angle of spread in the lateral direction of the ion beam, the width of energy spread of the ions, the longitudinal width of the ion beam, and the angle of spread in the longitudinal direction of the ion beam, respectively, while $A_x$, $A_\alpha$, $A_{\beta\beta}$, $A_y$ and $A_\beta$ are the respective coefficients of aberration. In the above described embodiment, if the condition given below is satisfied, $A_x = -0.09$, $A_\alpha = 0$, $A_\delta = 0$, $A_{\alpha\alpha} = 2.36$, $A\alpha\delta = 6.21$, $A_{\delta\delta} = -0.47$, $A_{yy} = -0.64$, $A_{y\beta} = 0.23$, $A_{\beta\beta} = 0.43$, $A_y = -1.74$ and $A_\beta = 0.08$.

[CONDITIONS]

Distance $l'$ from ion cource to entrance of the electrostatic field = 0.915 m; angle $\phi_e$ of deflection by the electrostatic field = 19.09°; radius $r_e$ of curvature of central ion trajectory in the electrostatic field = 0.703 m; intensity of the electrostatic field = $E_e$; $K = E_e/U_o = 2.844$ where $U_o$ is the voltage for accelerating ions; length $L$ of the electrostatic field = 0.23 m; distance $d_{eq}$ from exit of the electrostatic field to first lens = 0.1 m; length $QL_1$ of first lens = 0.13 m; $\sqrt{k_1/2U_o} = 4.67$ where $k_1$ is gradient of electrostatic field of first lens; distance $d_{qq}$ between first and second lenses = 0.067 m; length $QL_2$ of second lens = 0.13 m; $\sqrt{k_2/2U_o} = 4.53$ where $k_2$ is gradient of electrostatic field of second lens; distance $d_{qm}$ from second lens to entrance of the magnetic field = 0.1 m; angle $\phi_m$ of deflection by the magnetic field = 30°; radius $r_m$ of curvature of central ion trajectory in the magnetic field = 1.0 m; $\epsilon' = \epsilon'' = 15°$ where $\epsilon'$ is angle of incidence of ions into magnetic field and $\epsilon''$ is angle of leaving of ions from magnetic field; and distance $l''$ from exit of magnetic field to collector = 1.0 m.

As described above, this embodiment has a double focussing function ($A_\alpha = A_\delta = 0$), the aberration coefficients associated with the second order are small enough, and especially the aberration coefficients $A_{y\beta}$ and $A_{\beta\beta}$ concerning the longitudinal spread of ions are small, so that the distortion of the focussed ion image is small and a high resolution can be attained. Moreover, as regards the longitudinal width of the ion image, the two-directional or dimensional focussing effect is clearly observed since $A_\beta$ is small.

It should be noted that the positions of the electrostatic field and the magnetic field are exchangeable without causing any degradation of function.

It should also be noted that the embodiment described above is only for a better understand of this invention and that it by no means restricts the scope of the invention which is limited solely by the appended claims.

I claim:

1. A mass spectrometer comprising means for ionizing a sample to produce ions thereof, means for dispersing said ions according to their kinetic energies and mass numbers respectively to select ions having a specific mass number, means for generating a lens field to focus the dispersed ions having said specific mass number at a predetermined position which is disposed after said dispersion means, means for selectively electrically adjusting the intensity of said lens field, and means for detecting said focussed ions, said dispersion means being substantially free from focussing action of said dispersed ions having said specific mass number between said ionization means and said predetermined position.

2. A mass spectrometer as claimed in claim 1, wherein said dispersion means comprises a pair of flat plate electrodes disposed opposite to and in parallel with each other and a pair of magnetic poles each having a rectangular cross section disposed oppsoite to each other.

3. A mass spectrometer as claimed in claim 1, wherein said means for generating said lens field comprises two sets of quadrapole lenses, each of said two sets comprises four electrodes arranged substantially equidistantly on a circle with adjacent electrodes being different in polarity from each other, said two sets of quadrapole lenses being inverse in polarity to each other.

4. A mass spectrometer as claimed in claim 1, wherein said means for generating said lens field comprises two sets of quadrapole lenses, each of said two sets comprises four electrodes disposed substantially equidistantly on a circle with adjacent electrodes being different in polarity from each other, and such dispersion means comprises a pair of flat plate electrodes disposed opposite to and in parallel with each other and a pair of magnetic poles each having a rectangular cross section disposed opposite to each other.

5. A mass spectrometer as claimed in claim 4, wherein said pair of flat plate electrodes are nearer to said ionization means than said pair of magnetic poles, and said two sets of quadrapole lenses are disposed between said pair of flat plate electrodes and said pair of magnetic poles.

6. A mass spectrometer comprising means for ionizing a sample to produce ions thereof, means for generating an electrostatic field to disperse said ions according to their kinetic energies, means for generating a magnetic field to disperse said energy dispersed ions according to their mass numbers to select ions of a specific mass number, two lense means each for generating a lens field focussing said energy and mass number dispersed ions having said specific mass number at a predetermined position which is disposed after said mass number dispersion means, means for electrically adjusting each of the intensities of said two lens fields, and means for detecting said focussed ions, said energy dispersion means and said mass number dispersion means being substantially free from focussing action of said energy and mass number dispersed ions respectively having said specific mass number between said ionization means and said predetermined position, and wherein said two lense means are inverse in polarity to each other.

7. A mass spectrometer as claimed in claim 6, wherein said energy dispersion means comprises a pair of flat plate electrodes disposed opposite to and in parallel with each other, and said mass number dispersion means comprises a pair of magnetic poles each having a rectangular cross section disposed opposite to each other.

8. A mass spectrometer as claimed in claim 6, wherein each of said two lense means includes a lense provided with four electrodes arranged substantially equidistantly on a circle with adjacent electrodes being different in polarity from each other.

9. A mass spectrometer as claimed in claim 6, wherein each of said two lense means includes a lense provided with four electrodes arranged substantially equidistantly on a circle with adjacent electrodes being different in polarity from each other, and wherein said energy dispersion means comprises a pair of flat plate electrodes disposed opposite to and in parallel with each other, and said mass number dispersion means comprises a pair of magnetic poles each having a rectangular cross section disposed opposite to each other.

10. A mass spectrometer as claimed in claim 9, wherein said electrostatic field and said magnetic field are perpendicular to each other in direction, and said two lenses are disposed between said pair of flat plate electrodes and said pair of magnetic poles.

11. A mass spectrometer comprising a means for ionizing a sample and producing an ion beam; a means for dispersing said ions according to their kinetic energies; a means for dispersing said dispersed ions according to their mass numbers in a direction opposite to that of said dispersion in accordance with kinetic energies so as to select ions having a specific mass number; a means for focussing said ions having said specific mass number in the plane of said dispersion in accordance with their kinetic energies and in a plane perpendicular to said plane of said dispersion in accordance with their kinetic energies; and a means for detecting said ions having said specific mass number, thus focussed and selected, wherein said focussing means includes two sets of electrodes, disposed between both said dispersion means, each set being provided with four electrodes arranged substantially equidistantly on a circle with the adjacent electrodes having opposite polarities; and said focussing means further includes a means for applying voltages to said two sets of electrodes so that said two sets of electrodes are opposite in polarity to each other and the adjacent electrodes of eaid two sets of electrodes are different in polarity from each other, said voltages being variable; and said means for dispersing said ions according to their kinetic energies includes a pair of flat plate electrodes disposed opposite to and in parallel with each other while said means for dispersing said ions according to their mass numbers includes a pair of magnetic poles each having a rectangular cross section disposed opposite to each other.

* * * * *